(12) United States Patent
Brehm et al.

(10) Patent No.: US 9,120,035 B2
(45) Date of Patent: Sep. 1, 2015

(54) DEFOAMER FORMULATIONS COMPRISING ORGANOPOLYSILOXANES

(71) Applicant: Wacker Chemie AG, Munich (DE)

(72) Inventors: Christof Brehm, Burghausen (DE); Willibald Burger, Burghausen (DE); Elisabeth Hoelzlwimmer, Simbach (DE); Martina Joachimbauer, Haiming (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/399,555

(22) PCT Filed: Apr. 30, 2013

(86) PCT No.: PCT/EP2013/059030
§ 371 (c)(1),
(2) Date: Nov. 7, 2014

(87) PCT Pub. No.: WO2013/167430
PCT Pub. Date: Nov. 14, 2013

(65) Prior Publication Data
US 2015/0119509 A1    Apr. 30, 2015

(30) Foreign Application Priority Data
May 7, 2012 (DE) .......... 10 2012 207 484

(51) Int. Cl.
*B01D 19/04* (2006.01)
*C08L 83/06* (2006.01)
*C11D 3/00* (2006.01)
*C08L 83/10* (2006.01)

(52) U.S. Cl.
CPC .......... *B01D 19/0409* (2013.01); *C11D 3/0026* (2013.01); *C08L 83/06* (2013.01); *C08L 83/10* (2013.01)

(58) Field of Classification Search
None
See application file for complete search history.

(56) References Cited

U.S. PATENT DOCUMENTS

| | | | |
|---|---|---|---|
| 2,632,736 A | 3/1953 | Currie | |
| 3,383,327 A | 5/1968 | Sullivan | |
| 3,560,401 A | 2/1971 | O'Hara et al. | |
| 4,145,308 A | 3/1979 | Simoneau et al. | |
| 4,741,861 A | 5/1988 | Okada et al. | |
| 4,919,843 A | 4/1990 | Innertsberger et al. | |
| 5,153,258 A * | 10/1992 | Nakahara et al. | 524/588 |
| 6,605,183 B1 | 8/2003 | Rautschek et al. | |
| 7,105,581 B2 | 9/2006 | Burger et al. | |
| 7,619,043 B2 * | 11/2009 | Rautschek et al. | 525/477 |
| 2006/0160908 A1 * | 7/2006 | Rautschek et al. | 516/123 |
| 2009/0156755 A1 * | 6/2009 | Herzig et al. | 525/478 |
| 2010/0137544 A1 * | 6/2010 | Herzig et al. | 528/10 |

FOREIGN PATENT DOCUMENTS

| | | |
|---|---|---|
| DE | 2925722 A1 | 2/1981 |
| DE | 3805661 A1 | 9/1989 |
| DE | 4223644 A1 | 1/1993 |
| DE | 4444175 A1 | 6/1996 |
| DE | 102005036748 A1 | 2/2006 |
| DE | 102004052421 A1 | 5/2006 |
| EP | 0163541 A2 | 12/1985 |
| EP | 0217501 A2 | 4/1987 |
| EP | 0273448 A2 | 7/1988 |
| EP | 0301531 A2 | 2/1989 |
| EP | 0434060 A2 | 6/1991 |
| EP | 0516109 A1 | 12/1992 |
| EP | 0887097 A1 | 12/1998 |
| EP | 1060778 A1 | 12/2000 |
| EP | 1076073 A1 | 2/2001 |
| EP | 2072591 B1 | 6/2009 |
| GB | 2257709 A1 | 1/1993 |
| WO | 2007023084 A2 | 3/2007 |

* cited by examiner

*Primary Examiner* — Marc Zimmer
(74) *Attorney, Agent, or Firm* — Brooks Kushman P.C.

(57) ABSTRACT

A mixture of unique organopolysiloxane, filler, and additional components are effective defoamers and may be used neat, or in the form of a powder or emulsion.

19 Claims, No Drawings

DEFOAMER FORMULATIONS COMPRISING ORGANOPOLYSILOXANES

CROSS-REFERENCE TO RELATED APPLICATIONS

This application is the U.S. National Phase of PCT Appln. No. PCT/EP2013/059030 filed Apr. 30, 2013, which claims priority to German Application No. 10 2012 207 484.8 filed May 7, 2012, the disclosures of which are incorporated in their entirety by reference herein.

BACKGROUND OF THE INVENTION

1. Field of the Invention

The invention relates to the defoamer formulations comprising organopolysiloxanes and to the use thereof in aqueous surfactant systems.

2. Description of the Related Art

In many liquid systems, more particularly aqueous systems, which include surface-active compounds either as wanted or else unwanted constituents, problems due to foaming may occur if these systems are brought into more or less intense contact with gaseous substances, as for example when gasifying waste waters, when intensively stirring liquids, in distillation, washing, or coloring operations, or during dispensing procedures.

Controlling this foam may be accomplished mechanically or through the use of defoamers. In this context, siloxane-based defoamers have proven themselves particularly useful.

Defoamers based on siloxanes are prepared according to U.S. Pat. No. 3,383,327 A, for example, by heating hydrophilic silica in polydimethylsiloxanes. Employing basic catalysts allows the activity of such defoamers to be improved (U.S. Pat. No. 3,560,401 A). An alternative is to disperse hydrophobized silica in a polydimethylsiloxane, in accordance with DE 29 25 722 A, for example. But the activity of the resulting defoamers is still capable of improvement. Accordingly U.S. Pat. No. 4,145,308 A, for example, describes a defoamer preparation which as well as a polydiorganosiloxane and silica also includes a copolymer composed of $(CH_3)_3SiO_{1/2}$ units and $SiO_2$ units. Copolymers composed of $(CH_3)_3SiO_{1/2}$ and $SiO_2$ units are also said to be advantageous in combination with siloxanes which carry long alkyl groups (U.S. Pat. No. 4,919,843 A).

The use of partly crosslinked polydimethylsiloxanes, which are in part already rubberlike, for boosting the defoamer effect has been known for some considerable time (U.S. Pat. No. 2,632,736 A). Such products may be prepared, for example, by radical crosslinking of polydimethylsiloxane (e.g., DE 3805661 A1, EP 273 448 A2). But these methods are very unspecific and yield products which are difficult to handle.

EP 163 541 A2 teaches the production of a defoamer preparation having improved long-term effect by catalytic reaction of trimethylsiloxy-terminated polydimethylsiloxanes, hydroxyl-terminated polydimethylsiloxanes, an alkoxysilane and/or siloxane, or a copolymer composed of $(CH_3)_3SiO_{1/2}$ units and $SiO_2$ units, and also a filler, in the presence of a catalyst. Catalysts referred to are bases or organometallic compounds.

The preparation of a defoamer by mixing hydrophobic silica with a polysiloxane that has been prepared by alkali-catalyzed reaction at temperatures of more than 120° C. from trimethylsilyl-terminated polydimethylsiloxanes, hydroxyl-terminated polydimethylsiloxanes, and a copolymer composed of $(CH_3)_3SiO_{1/2}$ and $SiO_2$ units is described by EP 217 501 A2. The intention thereby is to improve the activity of the defoamer at high concentrations of anionic surfactants.

A boost in effect is possible through addition of partly crosslinked siloxanes (EP 434 060 A2). Such partly crosslinked and branched structures are also possible through the reaction of terminally vinyl-containing siloxanes with Si—H functional siloxanes (EP 516 109 A1, DE 44 44 175 A1, DE 42 23 644 A1).

EP 434 060 A2, EP 516 109 A1, and DE 42 23 644 A1 describe branched polysiloxanes as constituents of defoamers which are obtained in a hydrosilylation reaction of terminally vinyl-containing siloxanes with Si—H functional siloxanes, the branched polysiloxanes therefore having structural units of the formula $O_{2/2}MeSi—CH_2CH_2—SiMe_2O_{1/2}$.

Partly crosslinked and branched structures which are used in defoamer formulations are further accessible through reaction of compounds which have at least three aliphatic double bonds with Si—H-functionalized organopolysiloxanes (DE 10 200 40 52 421 A1, DE 10 200 50 36 748 A1).

U.S. Pat. No. 7,105,581 B1 describes antifoams based on siloxanes that comprise a branched polyether-polysiloxane copolymer as an additive. The copolymer added is a surfactant.

In strongly foaming, surfactant-rich systems, however, the defoamer formulations produced according to the prior art do not always exhibit sufficient activity or are difficult to handle on account of the high viscosity and/or the degree of crosslinking that is achieved.

SUMMARY OF THE INVENTION

An object of the invention was to provide siloxane-based defoamers which, particularly in surfactant-rich, strongly foaming media, exhibit an improved activity but are nevertheless easy to handle. The invention thus provides defoamer formulations comprising (1) organopolysiloxanes comprising per molecule
   at least one structural unit of the general formula $$O_{2/2}RSi—Y—SiRO_{2/2} \qquad (I)$$

and at least 2 units of the general formula $$R^1R_bSiO_{(3-b)/2} \qquad (II)$$

and units of the general formula $$R_cSiO_{(4-c)/2} \qquad (III),$$

where
   b is 0, 1, or 2, preferably 1 or 2, more preferably 2,
   c is 1 or 2, preferably 2,
   R are identical or different and are monovalent, SiC-bonded organic radicals having 1 to 30 C atoms which may comprise one or more non-adjacent O atoms and which is free from aliphatic multiple carbon-carbon bonds, and
   $R^1$ is the same as R or is an alkenyl radical having 2 to 4 C atoms,
   Y is a divalent organic radical having 1 to 30 C atoms, (2) fillers, (3) organopolysiloxane resins composed of units of the general formula $$R^2_e(R^3O)_fSiO_{(4-e-f)/2} \qquad (IV)$$

in which
   $R^2$ are identical or different and are hydrogen or a monovalent, optionally substituted, SiC-bonded hydrocarbon radical having 1 to 30 C atoms, $R^3$ are identical or different and are hydrogen or a monovalent, optionally substituted hydrocarbon radical having 1 to 4 C atoms, e is 0, 1, 2, or 3 and f is 0, 1, 2, or 3, with the proviso that the sum e+f is less than or equal to 3 and in less than 50% of all units of the formula (IV) in the organopolysiloxane resin, the sum e+f is 2, optionally (4) polyorganosiloxanes of the general formula

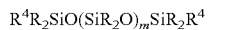  (Va) or

  (Vb)

where

R may be identical or different and has the definition specified for it above, $R^4$ may be identical or different and may be R or $OR^5$, where $R^5$ is a hydrogen atom or a monovalent, optionally substituted hydrocarbon radical having 1 to 25 C atoms, m is an integer, and preferably m is selected such that the polyorganosiloxanes of the formula (Va) have a viscosity at 25° C. and 101,425 kPa of 10 to 1,000,000 mPas, n is an integer, and preferably n is selected such that the polyorganosiloxanes of the formula (Vb) have a viscosity at 25° C. and 101,425 kPa of 2 to 15 mPas, with the proviso that the polyorganosiloxanes may also include small fractions of branching instances, preferably T units ($R^4SiO_{2/2}$) and Q units ($SiO_2$), optionally (5) a water-insoluble organic compound, and optionally (6) polyether-modified polysiloxanes, which may be linear or branched and which comprise at least one polyether group, and optionally (7) an alkaline or acidic catalyst or reaction product thereof with components (1) to (6).

The defoamer formulations preferably comprise (1) 100 parts by weight of inventive organopolysiloxanes (1), (2) at least 0.1 part by weight, preferably at least 1 part by weight, more preferably at least 2 parts by weight, and not more than 100 parts by weight, preferably not more than 70 parts by weight, more preferably not more than 40 parts by weight, of fillers, (3) at least 0.1 part by weight, preferably at least 1 part by weight, more preferably at least 2 parts by weight, and not more than 50 parts by weight, preferably not more than 20 parts by weight, more preferably not more than 15 parts by weight, of organopolysiloxane resins composed of units of the formula (IV), (4) minimally 0 part by weight, preferably at least 1 part by weight, more preferably at least 2 parts by weight, and not more than 900 parts by weight, preferably not more than 500 parts by weight, more preferably not more than 25 parts by weight, of polyorganosiloxanes of the general formula (Va) or (Vb), (5) minimally 0 part by weight, preferably at least 1 part by weight, more preferably at least 2 parts by weight, and not more than 900 parts by weight, preferably not more than 500 parts by weight, more preferably not more than 25 parts by weight, most preferably not more than 15 parts by weight, of water-insoluble organic compound, (6) minimally 0 part by weight, preferably at least 1 part by weight, more preferably at least 2 parts by weight, and not more than 200 parts by weight, preferably not more than 100 parts by weight, more preferably not more than 50 parts by weight, most preferably not more than 20 parts by weight, of polyether-modified polysiloxanes which may be linear or branched and which carry at least one polyether group, and (7) minimally 0 part by weight, preferably at least 0.05 part by weight, more preferably at least 0.1 part by weight, and not more than 5 parts by weight, preferably not more than 2 parts by weight, more preferably not more than 1 part by weight, of an alkaline or acidic catalyst or reaction product thereof with components (1) to (6).

The defoamer formulations preferably consist of the components (1) to (3) and optionally (4) and optionally (5) and optionally (6) and optionally (7).

The organopolysiloxanes (1) of the invention preferably contain per molecule, at least of one structural unit of the formula (I), at least two units of the formula (II), and units of the formula (III).

R preferably is a monovalent hydrocarbon radical having 1 to 18 carbon atoms which is free from aliphatic multiple carbon-carbon bonds.

Examples of hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl, and methylcyclohexyl radicals; aryl radicals such as the phenyl, naphthyl, anthryl, and phenanthryl radicals; alkaryl radicals such as o-, m-, and p-tolyl radicals, xylyl radicals, and ethylphenyl radicals; and aralkyl radicals such as the benzyl radical, and the α- and the β-phenylethyl radicals. The hydrocarbon radicals R may comprise ether groups or polyether groups.

Preferred examples of R are methyl, ethyl, and phenyl radicals.

Examples of radicals $R^1$ are the methyl, ethyl and phenyl, vinyl, allyl, and 3-butenyl radical, with the methyl radical and the vinyl radical being preferred examples.

$R^2$ is preferably a hydrocarbon radical having 1 to 18 carbon atoms. Examples of hydrocarbon radicals R apply fully with respect to hydrocarbon radicals $R^2$. Preferred examples of radicals $R^2$ are the methyl, ethyl, and phenyl radical.

Examples of radicals $R^3$ are hydrogen and alkyl radicals such as the methyl, ethyl, n-propyl, isopropyl, and n-butyl radicals. The radical $R^3$ is preferably hydrogen or a methyl or ethyl radical.

Examples of radicals $R^5$ are hydrogen and alkyl radicals such as the methyl, ethyl, n-propyl, isopropyl, and n-butyl radicals, and also isotridecyl, n-octyl, stearyl, 4-ethylhexadecyl, 2-octyl-1-dodecyl, or eicosanyl radicals. The radical $R^5$ is preferably hydrogen or a $C_1$-$C_{25}$ alkyl radical, such as a methyl, ethyl, or 2-octyl-1-dodecyl radical.

Preferred examples of radicals $R^4$ are the methyl, ethyl, and phenyl radicals, and the hydroxyl, methoxy, ethoxy, and 2-octyl-1-dodecyloxy radicals.

Polyorganosiloxanes of this kind of the formula (Va) with $R^4$ being a radical $OR^5$ are accessible, for example, through alkali-catalyzed condensation of silanol-terminated polydimethylsiloxanes and aliphatic alcohols such as isotridecyl alcohol, n-octanol, stearyl alcohol, 4-ethylhexadecanol, 2-octyl-1-dodecanol, or eicosanol.

In the context of the organopolysiloxanes (1) of the invention, a preferred unit of the formula (II) is one of the formula $R^1R_2SiO_{1/2}$, and preferred units of the formula (III) are those of the formula $R_2SiO$, where R is preferably a methyl radical and $R^1$ is preferably a methyl or vinyl radical.

A preferred example of a unit of the formula (II) is therefore the trimethylsiloxane unit and also the vinyldimethylsiloxane unit. Preferred examples of units of the formula (III) are dimethylsiloxane units.

Examples of Y in the structural unit (I) are the methylene group and the methine group, the 1,1-ethanediyl and the 1,2-ethanediyl group, the 1,4-butanediyl and the 1,3-butanediyl group.

If Y contains at least 2 C atoms, this radical may also be unsaturated. Examples thereof are radicals of the formula —CH=CH— (cis or trans), —C(=CH$_2$)— and —C≡C—.

Y is preferably a divalent organic radical having 1 to 12 C atoms, more preferably a divalent hydrocarbon radical having 1 to 12 C atoms, very preferably having 2 C atoms. Examples of particularly preferred radicals are those of the formula —CH$_2$CH$_2$—, —CH(CH$_3$)—, —CH=CH—, —C(=CH$_2$)—, and —C≡C—.

The viscosity of the organopolysiloxanes (1) of the invention is preferably at least 50 mPa·s, more preferably at least 500 mPa·s, and not more than 10,000 mPa·s, more preferably not more than 5000 mPa·s, in each case at 25° C. and 101,425 kPa.

Organopolysiloxanes (1) are described in WO 2007/023084 A2, especially page 4, line 16 to page 6, line 6 (incorporated by reference), and in EP 2 072 591 B1, especially page 3, line 53 to page 4, line 22 (incorporated by reference).

A preferred process for preparing the compounds (1) of the invention is the hydrolysis of compounds of the general formula

$$X_2RSi—Y—SiRX_2 \quad (VI),$$

where X is a hydrolyzable group and
R and Y have the definition stated above.
X is preferably a halogen, acid, and alkoxy group; more preferably X is a chlorine, acetate, formate, methoxy, or ethoxy group.

Particularly preferred is a process in which a cohydrolysis is carried out of compounds of the general formula (VI) with silanes of the general formula

$$R^2_dSiX_{4-d} \quad (VII),$$

where X is a hydrolyzable group,
$R^2$ is a radical R or $R^1$, and
d is 1, 2 or 3, preferably 2 or 3, more preferably 3.

Preferred for use as silanes (VII) are those of the formula $R^1R_2SiX$, where R, $R^1$ and X have the definition specified for them above.

A preferred version of the process is the preparation of the organopolysiloxanes (1) in two stages: A cohydrolysis of the compounds (VI) and (VII) to prepare a concentrate, followed by an equilibration of this concentrate with organopolysiloxanes which do not include the structural unit (I). Organopolysiloxanes used in the equilibration may be those selected from the group consisting of linear organopolysiloxanes having terminal triorganosiloxy groups, linear organopolysiloxanes having terminal hydroxyl groups, cyclic organopolysiloxanes, and copolymers of diorganosiloxane and monoorganosiloxane units. Preference is given to using linear organopolysiloxanes having terminal triorganosiloxy groups.

Preferred examples thereof are copolymers of vinyldimethylsiloxane and dimethylsiloxane units, and copolymers of trimethylsiloxane and dimethylsiloxane units, particular preference being given to copolymers of trimethylsiloxane and dimethylsiloxane units.

The equilibration results in the desired concentration of radicals $R^1$ in the organopolysiloxane (1) and hence its viscosity.

It is possible to use one kind of organopolysiloxane (1) or a mixture of at least two kinds of organopolysiloxanes (1).

The fillers (2) used in the defoamer formulations of the invention preferably have a BET surface area of 20 to 1000 m²/g. The fillers (2) preferably have a particle size of less than 10 μm and an agglomerate size of less than 100 μm.

Examples of fillers (2) are silicon dioxide (silicas), titanium dioxide, aluminum oxide, metal soaps, finely ground quartz, PTFE powders, fatty acid amides, e.g. ethylenebisstearamide, finely divided hydrophobic polyurethanes.

Fillers (2) used with preference are silicon dioxide (silicas), titanium dioxide, or aluminum oxide, with a BET surface area of 20 to 1000 m²/g. These fillers preferably have a particle size of less than 10 μm and an agglomerate size of less than 100 μm.

Preferred fillers (2) are silicas, more particularly those having a BET surface area of 50 to 800 m²/g. These silicas may be fumed or precipitated silicas. Fillers (2) used may be not only pretreated silicas, i.e. hydrophobic silicas, but also hydrophilic silicas. Examples of commercial hydrophobic silicas which may be used in accordance with the invention are HDK® H2000, a fumed silica treated with hexamethyldisilazanes and having a BET surface area of 140 m²/g (available commercially from Wacker-Chemie GmbH, Germany), and a precipitated, polydimethylsiloxane-treated silica having a BET surface area of 90 m²/g (available commercially under the designation "Sipernat D10" from Degussa AG, Germany).

Hydrophilic silicas may also be hydrophobized in situ if this is advantageous for the desired activity of the defoamer formulation. Methods for the hydrophobizing of silicas are widely known. The hydrophobizing of the hydrophilic silica in situ may be accomplished, for example, by heating the silica, dispersed in component (1) or (4), or in a mixture of components (1), (3), and optionally (4) and optionally (5), at temperatures from 100 to 200° C. for several hours. This reaction may be supported through the addition of catalysts, such as KOH, of hydrophobizing agents, such as short-chain, OH-terminated polydimethylsiloxanes, silanes, or silazanes.

The component (3) used in the defoamer formulations of the invention preferably comprises silicone resins composed of units of the formula (IV), in which in less than 30%, preferably in less than 5%, of the units in the resin, the sum e+f is 2.

The organopolysiloxane resins composed of units of the formula (IV) are preferably
MQ resins composed of units of the formulae

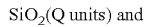

$SiO_2$(Q units) and

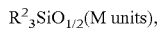

$R^2_3SiO_{1/2}$(M units), where $R^2$ has the definition specified for it above.

The molar ratio of M to Q units here is preferably in the range from 0.5 to 2.0, more preferably in the range from 0.6 to 1.0. Besides the M and Q units, the MQ resins may optionally also include small amounts of $R^2SiO_{3/2}$ (T) units or $R^2_2SiO_{2/2}$ (D) units, in amounts of preferably 0.01 to 20 mol %, more preferably 0.01 to 5 mol %, based on the sum of all siloxane units. These organopolysiloxanes may further include up to 10 wt % of free, Si-bonded hydroxyl or alkoxy groups, such as methoxy or ethoxy groups.

These organopolysiloxane resins (3), at 25° C. and 101,425 kPa, preferably have a viscosity of greater than 1000 mPa·s or are solids. The weight-average molecular weight determined by gel permeation chromatography (relative to a polystyrene standard) for these resins is preferably 200 to 200,000 g/mol, more particularly 1000 to 20,000 g/mol.

Examples of polyorganosiloxanes (4) optionally used in the defoamer formulations of the invention are polydimethylsiloxanes of the formula (Va) having a viscosity of 10 to 1,000,000 mPa·s and cyclic polydimethylsiloxanes of the formula (Vb) having a viscosity of 2 to 15 mPa·s, in each case at 25° C. and 101,425 kPa.

Although not indicated in formula (V), these polyorganosiloxanes (4) may include 0 to 1 mol %, preferably 0 to 0.02 mol %, based on the sum of all siloxane units, of other siloxane units, such as $RSiO_{3/2}$ (I) units or $SiO_2$ (Q) units (where R has the definition specified for it above).

In the defoamer formulations of the invention, water-insoluble organic compounds (5) may be used.

The term "water-insoluble" is intended in the sense of the present invention to refer to a solubility in water at 25° C. and a pressure of 101,425 kPa of not more than 3 percent by weight.

The optionally employed component (5) preferably comprises water-insoluble organic compounds having a boiling point of greater than 100° C. under the pressure of the surrounding atmosphere, in other words at 900 to 1100 hPa, more particularly those selected from mineral oils, natural oils, isoparaffins, polyisobutylenes, residues from the oxo-process alcohol synthesis, esters of low molecular mass synthetic carboxylic acids, such as pentane-1,3-diol diisobutyrate, fatty acid esters, such as octyl stearate, dodecyl palmitate, or isopropyl myristate, fatty alcohols, ethers of low molecular mass alcohols, phthalates, esters of phosphoric acid, and waxes.

In the defoamer formulations of the invention it is possible for polyether-modified polysiloxanes (6) to be used, which may be linear or branched and which carry at least one polyether group. Polyether-modified polysiloxanes of these kinds are known and are described for example in EP 1076073 A1, especially page 2, line 35 to page 4, line 46 (incorporated by reference).

Examples of alkaline catalysts (7) are alkali metal and alkaline earth metal hydroxides, such as NaOH, KOH, CsOH, LiOH, and $Ca(OH)_2$. Examples of acidic catalysts (7) are hydrochloric acid, sulfuric acid, and phosphorus nitride chlorides.

The reaction products of (7) with the components (1) to (6) comprise, for example, the product of the silica preferred as filler (2) with alkali metal hydroxides, such as potassium silicate or sodium silicate.

The metering of the catalysts may take place in typical organic solvents such as alcohols (such as methanol, ethanol, isopropanol) or esters (such as ethyl acetate).

The components (2) to (7) used in the defoamer formulations of the invention may in each case be one kind of such a component or else a mixture of at least two kinds of a respective component.

The defoamer formulations of the invention have a viscosity of preferably 100 to 2,000,000 mPa·s, more preferably of 10,000 to 80,000 mPa·s, in each case at 25° C. and 101,425 kPa.

Preferred formulations here are those for which the loss factor (ratio of loss modulus to storage modulus), measured in an oscillating viscosity measurement (corresponding to DIN 53019-1 and cited standards) with an amplitude of 1% and a circular frequency of 100 Hz, is less than 10, more particularly less than 5.

The compositions of the invention may be prepared by known methods, such as by mixing all of the components, such as with application of high shearing forces in colloid mills, dissolvers, or rotor-stator homogenizers. In this case the mixing operation may take place under reduced pressure, in order to prevent the incorporation of air, which is present in finely divided fillers, for example. This may be followed where required by the hydrophobizing of the fillers in situ.

It is also possible first to introduce, and possibly heat, components (1) and then to add in succession components (2), (3), optionally (4) and optionally (5) and optionally (6) and optionally (7).

In one preferred embodiment, component (3) is added in dissolved form as a solution in component (4) or parts of component (4), or as a solution in component (5) or parts of component (5).

The invention further provides emulsions comprising defoamer formulations of the invention,
emulsifiers, and
water.

If the defoamer formulations of the invention are emulsions, emulsifiers used may be all those known to the skilled person for preparing silicone emulsions, such as anionic, cationic, or nonionic emulsifiers. Preference is given to using emulsifier mixtures, in which case at least one nonionic emulsifier ought to be included, such as sorbitan fatty acid ester, ethoxylated sorbitan fatty acid ester, ethoxylated fatty acid, ethoxylated linear or branched alcohol having 10 to 20 carbon atoms and/or glycerol esters. It is further possible to add compounds known as thickeners, such as polyacrylic acid, polyacrylates, cellulose ethers such as carboxymethylcellulose and hydroxyethylcellulose, polyurethanes, natural thickeners, such as xanthan gum, and also preservatives, and other customary additions known to one skilled in the art.

The continuous phase of the emulsions of the invention is preferably water. It is also possible, however, to produce defoamer formulations of the invention in the form of emulsions, wherein the continuous phase is formed by components (1), (2), and (3) and optionally (4) and optionally (6) and optionally (7), or by component (5).

These may also be multiple emulsions.

Processes for preparing silicone emulsions are known. They are typically produced by simple stirring together of all of the constituents, with optional subsequent homogenization using jet dispersers, rotor-stator homogenizers, colloid mills, or high-pressure homogenizers.

If the composition of the invention comprises emulsions, preference is given to oil-in-water emulsions comprising 5 to 50 wt % of defoamer formulations of the invention comprising components (1) to (3) and optionally (4) and optionally (5) and optionally (6) and optionally (7), 1 to 20 wt % of emulsifiers and optionally thickeners, and 30 to 94 wt % of water.

The compositions of the invention may also be formulated as free-flowing powders. These powders are preferred in the context, for example, of application in laundry powder detergents. Production of these powders, starting from the defoamer formulations of the invention comprising components (1) to (3) and optionally (4) and optionally (5) and optionally (6) and optionally (7), is accomplished by methods known to the skilled person, such as spray drying or agglomerative granulation, and with additives known to the skilled person.

The invention further provides powders comprising defoamer formulations of the invention and carrier materials.

The powders of the invention preferably comprise 2 to 20 weight % of the defoamer formulations of the invention comprising components (1) to (3) and optionally (4) and optionally (5) and optionally (6) and optionally (7). Carriers employed may be, for example, zeolites, sodium sulfate, sodium bicarbonate, sodium carbonate, cellulose derivates, urea (derivates) and sugars. The powders of the invention contain 80 to 98 wt % of carrier materials. Further constituents of the powders of the invention may be, for example, waxes or organic polymers, as are described in EP-A 887097 and EP-A 1060778, for example.

Further provided by the present invention are detergents and cleaning compositions comprising the defoamer formulations of the invention or the defoamer formulations of the invention in the form of emulsions or in the form of powders.

The defoamer formulations of the invention can be used wherever it has also been possible hitherto to use defoamer formulations based on organosilicon compounds.

Further provided by the present invention is a method for defoaming and/or for preventing the foaming of media by mixing the defoamer formulations of the invention, or the emulsions or powders thereof, with the media.

In the examples which follow, all indications of parts and percentages, unless indicated otherwise, relate to the weight. Unless indicated otherwise, the following examples are carried out under the pressure of the surrounding atmosphere, in other words at about 1000 hPa, and at room temperature, in other words about 20° C., or at a temperature which comes about when the reactants are combined at room temperature without additional heating or cooling.

All of the viscosity figures cited in the examples are intended to be based on a temperature of 25° C. and a pressure of 101,425 kPa. They are determined in accordance with DIN EN ISO 3219: 1994 (polymers/resins in liquid, emulsified, or dispersed state) and DIN 53019 (measurement of viscosities and flow curves using rotary viscometers) on a rotary rheometer with air storage from Anton Paar, MCR301 with plate/cone systems.

The loss factor is determined according to ISO 6721-10 with an amplitude of 1% and a circular frequency of 100 Hz.

EXAMPLES 1a-1e

Preparation of the Organopolysiloxanes (1) Used in the Inventive Defoamer Formulations i) Condensate A1 comprising structural units (I) and (II):
270 g of vinyldimethylchlorosilane are mixed homogeneously with 96 g of a 1:1 adduct of hydrogenmethyldichlorosilane and vinylmethyldichlorosilane. This mixture is cohydrolyzed by dropwise addition of 750 ml of 5% strength HCl solution with ice cooling. Following phase separation, the resulting oligomer is washed 2 times each with water and 2% strength bicarbonate solution. The virtually neutral oil is freed from volatile constituents at 3 mbar and 130° C. Obtained in addition to 144 g of divinyltetramethyldisiloxane as oligomeric residue are 107 g of a cohydrolysate A1 of the chlorosilanes with a viscosity of 14.2 mm$^2$/s (25° C.)

ii) Condensate A2 comprising structural units (I) and (II):
130.2 g of trimethylchlorosilane are mixed homogeneously with 63 g of a 1:1 adduct of hydrogenmethyldichlorosilane and vinylmethyldichlorosilane. This mixture is cohydrolyzed by successive dropwise addition of 44 ml of 5% strength HCl solution and 440 ml of water with ice cooling. After a reaction time of an hour at room temperature, phase separation takes place. The resulting oligomer is washed 2 times each with water and 2% strength bicarbonate solution. The virtually neutral oil is freed from volatile constituents at 3 mbar and 130° C. Obtained in addition to 57 g of hexamethyldisiloxane as oligomeric residue are 52 g of a cohydrolysate A2 of the chlorosilanes.

iii) Equilibration of the condensate A1 or A2 with linear polydimethylsiloxane:
Linear, trimethylsilyl-terminated polydimethylsiloxane, in the quantity and having the viscosity as indicated in table 1, is introduced together with condensate A1 or A2, in the amount indicated in table 1, and the mixture is made homogeneous and heated to 120° C. Following addition of 200 ppm of phosphorus nitrile chloride (in solution in 1.5 times the amount of ethyl acetate), equilibration takes place at 120° C. until the viscosity is constant. When constant viscosity has been reached, the batch is deactivated with 1% MgO and filtered and is freed from volatile constituents under reduced pressure at 120° C. This gives inventive organopolysiloxanes (1a) to (1e) having the viscosity indicated in table 1.

TABLE 1

Preparation of the organopolysiloxanes (1) by equilibration of the condensate A1 or A2 with linear polydimethylsiloxane

| Organopoly-siloxane (1) | Polydimethylsiloxane | | Condensate | | |
|---|---|---|---|---|---|
| | Amount [g] | Viscosity [mPa · s] | Type | Amount [g] | Viscosity [mPa · s] |
| 1a | 900 | 30,000 | A1 | 35 | 3000 |
| 1b | 250 | 30,000 | A1 | 10 | 1150 |
| 1c | 300 | 30,000 | A1 | 12 | 2000 |
| 1d | 1000 | 30,000 | A2 | 36 | 1500 |
| 1e | 1000 | 30,000 | A1 | 36 | 2000 |

Comparative Polymer (C1f):
Preparation of an Organopolysiloxane (C1f) Bridged Via the Structural Unit $O_{2/2}RSi—Y—SiR_2O_{1/2}$ According to EP 434 060 B2 (not Inventive; Comparative Experiment C2):
99.20% of a linear, vinyldimethylsilyl-terminated polydimethylsiloxane with a viscosity of 500 mPa s are introduced with 0.75% of an Si—H-functionalized polysiloxane of the formula $(H_3C)_3Si—O—[Si(CH_3)H—O]_y—[Si(CH_3)_2—O]_z—Si(CH_3)_3$ (with y=5 and z=3), admixed with 0.05% of a platinum catalyst, and heated at 80° C. for 60 minutes. This gives an organopolysiloxane (C1f) which is bridged via $O_{2/2}RSi—Y—SiR_2O_{1/2}$ units and has a viscosity of 6000 mPa·s.

Examples

Examples 2a-2g and Comparative Experiments V1 and V2

Production of the Inventive Defoamer Formulations 2a-2g with the Inventive Organopolysiloxanes (1) and Production of the Noninventive Defoamer Formulations V1 and V2

To produce the defoamer formulations, the substances described in table 2 were mixed using a dissolver and heated at 150° C. for 4 hours in the presence of 1500 ppm of KOH (in the form of a 20% strength solution in methanol); after cooling, homogenization was carried out again with the dissolver.

TABLE 2

Composition of the defoamer formulations

| Ex. or comparative | Component (1) parts | Component (2) parts | Component (3) parts | Component (4) parts | Components (5)/(6) parts | Viscosity [Pa s] | Loss factor |
|---|---|---|---|---|---|---|---|
| 2a | 88 1a | 6 C1 | 2.5 D1 | — | 2.5 E1 | 8.93 | 1.85 |
| 2b | 29 1b | 6 C1 | 2.5 D1 | 59 B1 | 2.5 E1 | 16.3 | 4.18 |
| 2c | 88 1b | 6 C1 | 2.5 D1 | — | 2.5 E1 | n.d. | n.d. |
| 2d | 88 1c | 6 C1 | 2.5 D1 | — | 2.5 E1 | 9.53 | 1.97 |
| 2e | 88 1d | 6 C1 | 2.5 D1 | — | 2.5 E1 | 7.7 | 2.08 |
| 2f | 88 1e | 6 C1 | 2.5 D1 | — | 2.5 E1 | 8.57 | 1.92 |
| 2g | 85 1e | 5 C1 | 5 D1 | — | 2.5 E1 2.5 E1 | 10.2 | 1.48 |
| V1 [1] | — | 5 C1 | 2.5 D1 | 89 B1 | 2.5 E1 | 26.5 | n.d. |
| V2 [2] | 82 C1f not inventive | 5 C1 | 2.5 D1 | 7 B2 | 2.5 E1 | 26.3 | n.d. |

[1] Comparative experiment V1 according to EP 301 531 A2
[2] Comparative experiment V2 according to EP 434 060 B2

Substances used:
B1: A polydimethylsiloxane terminated with trimethylsiloxane groups and having a viscosity of 0.008 m²/s
B2: A polydimethylsiloxane terminated with trimethylsiloxane groups and having a viscosity of 0.0001 m²/s
C1: A hydrophilic fumed silica having a BET surface area of 300 m²/g (available from Wacker Chemie AG, Germany under the designation HDK ® T30)
D1: A silicone resin solid at room temperature and consisting of (according to $^{29}$Si-NMR and IR analysis) 40 mol % of $CH_3SiO_{1/2}$, 50 mol % of $SiO_{4/2}$, 8 mol % of $C_2H_5OSiO_{3/2}$ and 2 mol % of $HOSiO_{3/2}$ units, with a weight-average molar mass of 7900 g/mol (relative to polystyrene standard)
E1: A hydrocarbon mixture having a boiling range of 235-270° C.
E2: A polyether-modified silicone copolymer of the structure $(H_3C)_3Si$—$[Si(CH_3)_2O]_u$—$[GSi(CH_3)O]_v$—$Si(CH_3)_3$ where G = $(CH_2)_3$—$(O$—$CH_2CH_2)_w$—$(O$—$CH(CH_3)$—$CH_2)_x$—$OH$, where u, v, w and x are selected such that the polymer has a viscosity of 1100 mPa·s and a cloud point (according to DIN EN 1890) of 25° C.

Testing of the Inventive Defoamer Formulations 2a-2g and of the Noninventive Comparative Formulations V1 and V2 for their Defoamer Effectiveness:

The resulting inventive and noninventive defoamer formulations were then tested by means of the test in black liquor. The results of these tests are summarized in tables 3-5.

For more effective testing, a mixture was prepared from 40 parts of the defoamer formulations identified in table 2 and 60 parts of a mixture of aliphatic hydrocarbons having a viscosity of 3 mm²/s and a flash point>100° C., using a laboratory dissolver at 1000 min⁻¹.

Testing in Black Liquor:

400 ml of black waste liquor from the chemical-pulp process are pumped in circulation at a pumping rate of 1.5 l/min in a 1000 ml circulation pumping apparatus thermostatted at 80° C. As soon as the foam level has reached a height of 75 mm, the defoamer is metered in, and a record is made of the foam collapse time and of the lowest foam level reached following addition of defoamer and start of foam collapse. The smaller the foam collapse time t1 and the lower the foam level h1, the better the rapid effect of a defoamer.

After that, the long-term effect of the defoamer is ascertained, representing the time span t2 required to get from the lowest foam level to the original foam level (75 mm).

TABLE 3

Results of the testing of defoamer effectiveness on black waste liquor from the chemical-pulp process (Hardwood from UPM Kymmene Oy from Kuusankoski, Finland)
Metered addition: 4 µl of the above-prepared mixture of defoamer formulation and hydrocarbon mixture

| Example or comparative | Foam collapse time t1 in [s] | Foam level after foam collapse [mm] | Long-term effect t2 in [s] |
|---|---|---|---|
| V1 [1] | 40 | 18 | 430 |
| 2b | 32 | 17 | 475 |
| 2c | 36 | 17 | 530 |

[1] Comparative experiment V1 according to EP 301 531 A2

The inventive examples in this test on defoaming of Hardwood black waste liquor, as compared with the comparative formulation V1, have a shorter foam collapse time for a given foam height, and also a better long-term effect, than the formulations produced in accordance with the prior art.

This very good defoamer effect occurs not only in example 2b, where the inventive organopolysiloxane 1c accounts only for a relatively small part of the defoamer formulation, but also in example 2c, in which the inventive organopolysiloxane 1c accounts for the major part of the defoamer formulation.

TABLE 4

Results of the testing of defoamer effectiveness on black waste liquor from the chemical-pulp process (Softwood from UPM Kymmene Oy from Kuusankoski, Finland)
Metered addition: 3 µl of the above-prepared mixture of defoamer formulation and hydrocarbon mixture

| Example or comparative | Foam collapse time t1 in [s] | Foam level after foam collapse [mm] | Long-term effect t2 in [s] |
|---|---|---|---|
| V2 [2] | 38 | 9 | 700 |
| 2a | 30 | 6 | 1700 |
| 2d | 26 | 6 | 1300 |

[2] Comparative experiment V2 according to EP 434 060 B2

The inventive examples show themselves to be highly efficient in the defoaming of softwood black waste liquor as well. This comes to light in inventive examples 2a and 2d, which show themselves to be superior to the comparative formulation V2 not only in the foam collapse time for the same foam height but also in the long-term effect.

TABLE 5

Results of the testing of defoamer effectiveness in a further black waste liquor from the chemical-pulp process (Softwood from UPM Kymmene Oy from Kuusankoski, Finland)
Metered addition: 3 µl of the above-prepared mixture of defoamer formulation and hydrocarbon mixture

| Example or comparative | Foam collapse time t1 in [s] | Foam level after foam collapse [mm] | Long-term effect t2 in [s] |
|---|---|---|---|
| V2 [2] | 15 | 22 | 178 |
| 2e | 16 | 19 | 323 |
| 2f | 20 | 18 | 380 |
| 2g | 11 | 16 | 1470 |

[2] Comparative experiment V2 according to EP 434 060 B2

In this black waste liquor as well, from Softwood, the extremely efficient defoaming is apparent. The inventive examples 2e-2g show themselves to be significantly superior especially in the long-term effect, over the comparative formulation V2.

The invention claimed is:
1. A defoamer formulation comprising
(1) organopolysiloxane(s) comprising per molecule at least one structural unit of the formula

$$O_{2/2}RSi-Y-SiRO_{2/2} \quad (I),$$

and at least 2 units of the formula $$R^1R_bSiO_{(3-b)/2} \quad (II),$$

and units of the formula $$R_cSiO_{(4-c)/2} \quad (III),$$

where
b is 0, 1, or 2,
c is 1 or 2,
R are identical or different and are monovalent, SiC-bonded organic radicals having 1 to 30 C atoms, which are free from aliphatic multiple carbon-carbon bonds and which optionally contain one or more non-adjacent O atoms,
$R^1$ is the same as R or is an alkenyl radical having 2 to 4 C atoms,
Y is a divalent organic radical having 1 to 30 C atoms,
(2) fillers,
(3) organopolysiloxane resin(s) comprising units of the formula $$R^2_e(R^3O)_fSiO_{(4-e-f)/2} \quad (IV),$$

in which
$R^2$ are identical or different and are hydrogen or a monovalent, optionally substituted, SiC-bonded hydrocarbon radical having 1 to 30 C atoms,
$R^3$ are identical or different and are hydrogen or a monovalent, optionally substituted hydrocarbon radical having 1 to 4 C atoms,
e is 0, 1, 2, or 3 and
f is 0, 1, 2, or 3,
with the proviso that the sum e+f is less than or equal to 3 and in less than 50% of all units of the formula (IV) in the organopolysiloxane resin, the sum e+f is 2,
optionally
(4) polyorganosiloxanes of the formula $$R^4R_2SiO(SiR_2O)_mSiR_2R^4 \quad (Va) \text{ or}$$

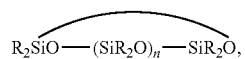
$R_2SiO-(SiR_2O)_n-SiR_2O$, (Vb)

where
R are identical or different and have the definition specified for R above,
$R^4$ are identical or different and are R or $OR^5$, where
$R^5$ is hydrogen or a monovalent, optionally substituted hydrocarbon radical having 1 to 25 C atoms,
m is an integer,
n is an integer,
with the proviso that the polyorganosiloxanes optionally include a portion of branching instances,
(5) optionally one or more water-insoluble organic compounds,
(6) optionally polyether-modified polysiloxanes, which are optionally linear or branched and which comprise at least one polyether group,
and
(7) optionally an alkaline or acidic catalyst or reaction product thereof with components (1) to (6).

2. The defoamer of claim 1, wherein b is 1 or 2, c is 2, Y is a divalent hydrocarbon radical having 1 to 12 C atoms, and $R^2$ is a monovalent hydrocarbon radical having 1 to 18 C atoms.

3. The defoamer of claim 1, wherein m is selected such that the polyorganosiloxanes of the formula (Va) have a viscosity at 25° C. and 101,425 kPa of 10 to 1,000,000 mPa·s.

4. The defoamer of claim 1, wherein n is selected such that the polyorganosiloxanes of the formula (Vb) have a viscosity at 25° C. and 101,425 kPa of 2 to 15 mPa·s.

5. The defoamer of claim 2, wherein m is selected such that the polyorganosiloxanes of the formula (Va) have a viscosity at 25° C. and 101,425 kPa of 10 to 1,000,000 mPa·s and n is selected such that the polyorganosiloxanes of the formula (Vb) have a viscosity at 25° C. and 101,425 kPa of 2 to 15 mPa·s.

6. The defoamer formulation of claim 1, comprising
(1) 100 parts by weight of organopolysiloxane(s) (1),
(2) at least 0.1 part by weight and not more than 100 parts by weight of fillers,
(3) at least 0.1 part by weight and not more than 50 parts by weight of organopolysiloxanes composed of units of the formula (IV),
(4) optionally, up to 900 parts by weight of polyorganosiloxane(s) of the general formula (Va) or (Vb),
(5) optionally, up to 900 parts by weight of water-insoluble organic compound,
(6) optionally, up to 200 parts by weight, of linear or branched polyether-modified polysiloxanes which carry at least one polyether group, and
(7) optionally, up to 5 parts by weight of an alkaline or acidic catalyst or reaction product thereof with components (1) to (6).

7. The defoamer formulation of claim 1, characterized in that Y is a radical of the formula —$CH_2CH_2$—.

8. The defoamer formulation of claim 1 wherein $R^1$ is a methyl or vinyl radical.

9. The defoamer formulation of claim 1, wherein at least one filler (2) comprises silica.

10. The defoamer formulation of claim 1, wherein organopolysiloxane resin(s) (3) comprise MQ resins comprising units of the formulae $$SiO_2 \text{(Q units) and}$$

$$R^2_3SiO_{1/2} \text{(M units),}$$

where
the molar ratio of M to Q units is in the range from 0.5 to 2.0, and wherein the MQ resins, in addition to the M and Q units, optionally include small amounts of $R^2SiO_{3/2}$ (T) units or $R^2_2SiO_{2/2}$ (D) units in amounts of 0.01 to 20 mol %, based on the sum of all siloxane units, and the MQ resins optionally include up to 10 wt % of free, Si-bonded hydroxyl or alkoxy groups.

11. The defoamer formulation of claim 1 wherein polyorganosiloxane(s) (4) of the formula (Va) comprise dimethylpolysiloxanes.

12. The defoamer formulation of claim 1, wherein polyorganosiloxanes (4) comprise dimethylpolysiloxanes of the formula (Va) with $R^4$ being a radical $OR^5$, where $R^5$ is a $C_1$-$C_{25}$ alkyl radical.

13. The defoamer formulation of claim 1, wherein water-insoluble organic compounds (5) comprise those having a boiling point of greater than 100° C. at 900 to 1100 hPa.

14. The defoamer composition of claim 13, wherein the water-insoluble organic compounds are selected from the group consisting of mineral oils, natural oils, isoparaffins, polyisobutylenes, residues from the oxo-process alcohol synthesis, esters of synthetic carboxylic acids, fatty acid esters, fatty alcohols, ethers of alcohols, phthalates, esters of phosphoric acid, waxes, and mixtures thereof.

15. An emulsion of a defoamer formulation, comprising
the defoamer formulation of claim 1,
at least one emulsifier, and water.

16. A powder, comprising
the defoamer formulation of claim 1, and at least one carrier material.

17. A detergent or cleaning composition comprising
the defoamer formulation of claim 1, an emulsion thereof, or a powder thereof.

18. A method for defoaming and/or for preventing foaming of liquid media, comprising mixing a defoamer formulation of claim 1, an emulsion thereof, or a powder thereof, with the media.

19. The method of claim 18, wherein the liquid media comprises aqueous media from chemical-pulp production.

* * * * *